Patented July 20, 1926.

1,593,487

UNITED STATES PATENT OFFICE.

ANTOINE REGNOUF DE VAINS, OF MIRIBEL, FRANCE.

PROCESS OF RENDERING CHLORIDES OF KETONES SOLUBLE BY TREATING WITH SULPHITES MADE FROM WASTE LIQUORS.

No Drawing. Original application filed December 11, 1922, Serial No. 606,294, and in France December 14, 1921. Divided and this application filed October 19, 1923. Serial No. 669,624.

The present application is a division of application, Serial No. 606,294 filed December 11, 1922, which has matured into Patent No. 1,516,377.

My Patent No. 1,445,495 of February 13, 1923, has as its object to render soluble the chlorides of ketones formed by the action of chlorine upon a ligno- or pecto-cellulose, and the solution of the oxidized organic products formed by the action of chlorine upon a semi-pulp of cellulose, the solvent used being wash alkaline liquors derived from the lixiviation of cellulosic materials.

I have discovered that, instead of treating the ketonic chlorides by means of wash liquors, solution of these chlorides can be effected by transforming the sodic element contained in the wash liquors into sodium sulphite by the action of sulphurous anhydride or of an alkali metal bisulphite solution or of a bisulphite solution of the alkaline earths. The ketonic chlorides are soluble in solutions of sodium sulphite.

It is then sufficient to treat the wash liquors with the sodium sulphite reagent referred to above. A precipitate of more or less well defined materials is obtained and, by filtration, a clear liquid results which can be used for rendering soluble the ketonic chlorides formed.

I have also found that the rendering soluble of the ketonic chlorides can be effected by using wash organic liquors at any degree of concentration, originating from the washing of any organic matter which has been lixiviated by alkalies. In this case the rendering soluble of the ketonic chlorides takes place under the action of free or combined alkalies contained in the water used to wash the lixiviated matter, the strong juices extracted directly from the lixiviated matter being capable of use for other reactions. In this case, the lixiviated material is washed with hot or cold water and then extracted by suitable means.

The improvements described in the present specification permit, as do the improvements described in the above mentioned patent, of neutralizing the excess chlorine introduced during the chlorination reaction and of neutralizing the hydrochloric acid formed by the chlorination reaction and of dissolving the chlorinated or oxidized organic products formed by the action of the chlorine on the ligno- and pecto-cellulose or upon a semi-pulp of cellulose.

I claim:

1. A process for rendering soluble the chlorides of ketones contained in a pulp treated with chlorine, consisting in transforming the sodic element contained in wash alkaline liquor derived from the lixiviation of cellulosic materials into sodium sulphite, in filtering the resulting liquid, and in mixing it with the pulp.

2. A process for rendering soluble the chlorides of ketones contained in a pulp treated with chlorine, consisting in transforming the sodic element contained in wash alkaline liquors derived from the lixiviation of cellulosic materials into sodium sulphite by the action of sulphurous anhydride, in filtering the resulting liquid, and in mixing it with the pulp.

3. A process for rendering soluble the chlorides of ketones contained in a pulp treated with chlorine, consisting in transforming into sodium sulphite, the sodic element contained in a weak liquor resulting from the washing of cellulosic material previously lixiviated by means of relatively strong sodic liquors, in filtering the resulting liquid, and in mixing it with the pulp.

4. A process for rendering soluble, the chlorides of ketones contained in a pulp treated with chlorine, consisting in treating with sulphurous anhydride a weak sodic liquor resulting from the washing of cellulosic material previously lixiviated by means of relatively strong sodic liquors, in filtering the resulting liquid, and in mixing it with the pulp.

ANTOINE REGNOUF DE VAINS.